Patented Oct. 12, 1954

2,691,571

UNITED STATES PATENT OFFICE 2,691,571

TITANIUM DIOXIDE MANUFACTURE

Holger H. Schaumann, Newark, and Ignace J. Krchma, Wilmington, Del., assignors to E. I. du Pont de Nemours & Company, Wilmington, Del., a corporation of Delaware No Drawing. Application September 25, 1952, Serial No. 311,534

7 Claims. (Cl. 23—202)

This invention relates to the production of titanium dioxide pigments and more particularly to novel methods for preparing improved rutile pigments. More specifically, the invention provides novel procedures for controlling the particle formation of $TiO_2$ pigments through the employment of novel nucleating agents in the vapor phase oxidation of a titanium halide such as titanium tetrachloride.

Researches in the field of vapor phase oxidation of titanium tetrachloride to produce titanium dioxide have been directed toward those factors which afford a more flexible control over pigment properties and qualities. Such control not only allows the production of improved pigments but also allows the production of pigments with properties making them suitable for possible new and varied uses. Furthermore, such control allows the production of normal high quality titanium dioxide pigments under varied conditions of operation. This is important because under existing processes high reaction temperatures (of the order of 800–1350° C.) are required for the vapor phase oxidation of titanium tetrachloride with oxygen-containing gases. Because of the high temperatures and highly corrosive nature of the reactant gas, titanium tetrachloride, and due to the extreme purity of product required, very special equipment made of corrosion-resistant materials must be employed in preheating the titanium tetrachloride vapor prior to its introduction into the reactor. These materials comprise fragile, non-metallic products, such as fused silica, which are very expensive and readily subject to breakage. The required use of these materials represents a severe problem resulting not only in excessively high maintenance costs but constituting a hazard to safety of the operating personnel, since unwarned and unforseen breakage of the equipment when in use can expose operating personnel to the heated vapor of titanium tetrachloride which is dangerously irritating and corrosive. Any improvement, even an incremental reduction, in the operating temperature of such preheating equipment not only advantageously increases its life and renders the equipment safer for use and less costly to operate but represents an advance of great value in the art.

In the vapor phase oxidation of titanium tetrachloride, heated titanium tetrachloride vapor and a heated oxygen-containing gas are continuously brought together in such a manner that rapid and uniform intermingling of the two reacting gases takes place. To assist and promote the reaction between oxygen and titanium tetrachloride, preheating of the reactants is resorted to. The nature of the vapor phase reaction between titanium tetrachloride and oxygen is such that the rapidity of the reaction is increased if activation or nucleation centers for the reaction are furnished. The increased reaction rate tends to improve uniformity of product when the proper nucleation particles are provided. Thus, the addition of water vapor, or hydrogenous water formers, to the titanium tetrachloride vapor or air streams, as contemplated in U. S. Patents Nos. 2,488,439 and 2,488,440, advantageously affords through nucleation of the titanium dioxide production of a high quality rutile pigment. Disadvantageously, the HCl produced by the reaction of hydrogen of the water constitutes a source of undesired chlorine loss. Even more important, control of the pigment properties, particularly color retention of white paints and enamels, can be obtained when recourse is had to the addition of aluminum trichloride to the titanium tetrachloride, either in the liquid or gaseous state before or after preheating, or to the reactor proper, as contemplated in U. S. Patent 2,559,638. While these procedures prove highly advantageous and effective, a further nucleation control is needed in the oxidation, particularly in regulating pigment properties of the titanium dioxide product when operating in a relatively low, more desirable titanium tetrachloride vapor preheat temperature range of, say, 136–400° C. In such range, recourse to metallic materials of construction such as nickel for the titanium tetrachloride preheating equipment can be effected, if desired, thereby avoiding the necessity of using fragile non-metal materials of construction.

It is among the objects of this invention to overcome certain disadvantages in prior vapor phase oxidation methods for obtaining $TiO_2$ pigments and to provide novel and effective methods for attaining such objects. A particular object of the invention is to afford a continuous method for producing pigment-quality rutile titanium dioxide by oxidation of gaseous titanium tetrachloride with oxygen-containing gas. A further object is to provide a novel method for reducing the titanium tetrachloride preheat temperature necessary to continuously maintain adequate reaction temperature. A specific object is to afford an improved control of nucleation of the titanium dioxide formation to maintain pigment properties at the optimum point over a wide range of preheat temperatures. A further object is to provide a novel nucleating agent for use in such vapor phase oxidation procedures. Other objects and advantages of the invention will be apparent from the ensuing description.

The above and other objects are realized by this invention which broadly comprises preparing pigment quality titanium dioxide by decomposing titanium tetrachloride in the vapor phase by reaction with an oxygen-containing gas, under controlled oxidation conditions in the presence of a regulated, relatively small amount of a reduced titanium chloride nucleating agent.

In a more specific and preferred embodiment, the invention comprises preparing pigment quality rutile by reacting, at temperatures ranging from 800–1350° C. within a closed reactor, $TiCl_4$ with an oxidizing gas, and effecting said reaction in the presence of from about .1 to 10 parts by weight of $TiCl_3$ per 100 parts of $TiCl_4$.

In one practical adaptation of the invention, a portion of the anhydrous titanium tetrachloride vapor is prereacted with a suitable reducing agent to form controlled, small quantities of reduced titanium chloride, such as $TiCl_3$ or $TiCl_2$, in vaporous or finely divided, solid form prior to or at the point of introduction of the tetrachloride vapor into the oxidation reactor. The resulting vaporized mixture of titanium tetrachloride and lower titanium chlorides is then continuously and conventionally oxidized to titanium dioxide of pigment quality by commixing and commingling said mixture within a suitable reactor with an oxygen-containing gas at a reaction temperature in the range of from about 800–1350° C. Thereafter, the desired $TiO_2$ pigment is recovered from the reaction products and ground or otherwise suitably treated to obtain a product exhibiting essential texture, color, particle size, etc. characteristics.

Formation of the lower titanium chlorides suitable for nucleation of the vapor phase oxidation in accordance with the invention can most conveniently be effected in auxiliary or associated reaction equipment which will be referred to herein as a lower chloride generator. This generator can be constructed as part of, or within, the titanium tetrachloride vapor feed line leading to the oxidation reactor, or preferably on a diversion conduit suitably separated from the main titanium tetrachloride vapor line but reunited with said line after passing through the lower chloride generator. The generator can consist of an auxiliary reaction space so arranged that efficient contact will occur between the titanium tetrachloride vapor and a reducing agent such as a metal, hydrogen, hydride, etc., capable of reducing a portion of said vapor to a lower valence, usually to titanium trichloride. Thus, titanium tetrachloride vapor can be passed through a suitable preheater constructed of metal, if desired, when the preheat temperature is below the preferred limit of about 400° C. The preheated titanium tetrachloride vapor is then passed through a regulator, such as a valve or other type of device, by means of which a portion of the $TiCl_4$ stream is diverted in any desired ratio to an associated lower chloride generator. The latter can comprise an enlarged conduit or pipe into or within which a suitable granular solid, liquid, or gaseous reducing agent is introduced or retained so that the diverted titanium tetrachloride vapor stream will come in direct contact with the particles of reducing material while at a temperature ranging from 136° C. to 400° C. The stream of mixed titanium tetrachloride vapor and reduced titanium chlorides which discharges from the generator is then reunited with the original titanium tetrachloride vapor stream prior to entrance of the latter into the main oxidation reactor for commixing and reaction with a preheated oxygen-containing gas. The reaction products, after discharge from the reactor, are quickly cooled, the titanium dioxide product being separated from the by-product chlorine gas and inert gases such as nitrogen. After separation, the titanium dioxide can be subjected to the usual finishing treatment, including, preferably, subjection to mild (500–700° C.) calcination and followed by fluid energy mill or equivalent grinding treatment to give a high-quality titanium dioxide pigment product. The reducing agent added to the lower chloride generator can be replenished as consumed, and when the reducing agent used comprises one forming a solid or liquid by-product chloride, the by-product can be removed periodically or continuously to prevent blowover into the reactor and avoid contamination of the titanium dioxide pigment product. If desired, an additional preheater for the diverted titanium tetrachloride stream, ahead of the lower chloride generator, can be used to establish and insure the exact temperature conditions to provide nucleation of the titanium tetrachloride in the vapor phase oxidation reaction.

To a clearer understanding of the invention, the following examples are given. These are merely illustrative and are not to be construed as limiting the scope of the invention:

*Example I*

100 parts by weight of titanium tetrachloride vapor were preheated to a temperature of 765° C. in silica equipment. A portion of the $TiCl_4$ vapor stream was continuously admitted, at a rate equivalent to 10 parts by weight per hour, to a lower chloride generator wherein about 10% of the diverted titanium tetrachloride vapor stream was reacted by passage through and direct contact with a body of pulverized titanium metal sponge granules maintained in said generator to form $TiCl_3$ in said vapor as a subchloride nucleator. The resulting titanium chloride mixture was then reunited with the main $TiCl_4$ stream and the vaporous mixture thus obtained was charged immediately and continuously into the upper portion and main vapor phase oxidation reaction chamber of a tubular form of vertical, corrosion-resistant reactor. Simultaneously, 17 parts by weight per hour of oxygen as air, preheated to 750° C., were continuously charged from a separate inlet to said chamber commixed with the titanium tetrachloride bearing the minor amount of reduced titanium chlorides. In consequence, reaction occurred at reaction temperature held at about 1000° C., the flow rates used providing an average retention time of the reactant and product gases within the reactor of about .15 second. The resulting titanium dioxide product, upon its continuous discharge from said reactor, was subjected to immediate, rapid cooling to below 600° C. and thereafter calcined at 650° C. for 2 hours and dry ground in a fluid energy mill. From this continuous operation, substantially complete conversion of the titanium chloride reactants to the oxide occurred and a rutile titanium dioxide pigment was obtained, the pigment and paint properties of which were excellent in all respects.

Using the same flow rates and preheat temperatures for air and titanium tetrachloride vapor used above, but without the use of the lower chloride generator or the introduction of lower titanium chlorides, an unsatisfactory type of $TiO_2$ product was obtained as the result of the vapor phase oxidation of these reactants, at the same reaction temperature.

*Example II*

100 parts by weight per hour of titanium tetrachloride vapor were preheated to a temperature of 400° C. in nickel heat exchange equipment. A portion of the preheated $TiCl_4$ product was continuously admitted at a rate equivalent to 25 parts by weight per hour to a lower chloride generator wherein about 4% thereof became reacted with pulverized titanium metal sponge to form reduced titanium chlorides. The resulting lower chlorides-containing portion was then mixed with the main titanium tetrachloride body and the mixture was then admitted immediately and continuously into the main vapor phase oxidation reaction chamber of a reactor of the type employed in Example I. Through a separate inlet to said reactor, 17 parts by weight per hour of oxygen, as air preheated to 1100° C., were simultaneously and continuously commixed with the titanium tetrachloride vapor containing about 1 part by weight of reduced titanium chlorides for each part of titanium tetrachloride. In this way the reaction temperature was held at about 1000° C. and the flow rates used provided an average retention time of the reactant and product gases within the reactor of about .15 second. The titanium dioxide product on discharge from the reactor outlet was cooled rapidly to below 600° C., separated from the product gases, and subjected to calcination at 650° C. for 2 hours. Thereafter it was dry ground in a fluid energy (micronizer) mill. From the above process, operated continuously with substantially complete conversion of the titanium chloride reactants to the oxide, a high-grade rutile pigment was obtained, with the use of fragile silica preheating equipment for the titanium tetrachloride vapor being dispensed with.

*Example III*

100 parts by weight per hour of titanium tetrachloride vapor were preheated to 200° C. in metal heat exchange equipment. A diverted portion (10%) of the preheated stream was passed through an associated lower chloride generator wherein it was contacted and reacted with molten sodium metal to reduce about 25% of the diverted titanium tetrachloride vapor to the lower chlorides. The mixture of lower chlorides and titanium tetrachloride obtained was then united with the original stream of titanium tetrachloride to provide a $TiCl_4$ vapor in which a reduced chloride concentration of about 2.5 parts by weight (based on the initial feed rate of titanium tetrachloride) was present. This mixture was then immediately and continuously introduced into the main vapor phase reactor chamber of a reactor of the type employed in Example I. Through a separate inlet, 17 parts by weight per hour of oxygen preheated to 850° C. were simultaneously commixed with the titanium tetrachloride-lower chloride mixture in said chamber. The temperature of the main oxidation reactor was thereby held at about 950° C., the reactant rates used providing an average reactor retention time of about .1 second. The suspension of titanium dioxide-containing product discharged from the reactor was rapidly cooled to below 600° C., and the separated $TiO_2$ was thereafter calcined and dry ground as in the foregoing examples. This process effected a complete conversion of the titanium chloride reactants to rutile titanium dioxide having excellent pigment characteristics. The molten sodium fed to the lower chloride generator was continually replenished during the process and solid sodium chloride formed was removed from the generator periodically.

While the invention has been illustrated above as applied to certain specific embodiments, it is not to be construed as limited thereto. Thus, while particular reducing agents for reaction with the anhydrous $TiCl_4$ vapor to form titanium subchlorides have been mentioned as utilizable, general use is contemplated of almost all metallic elements in the elemental form as well as metal hydrides, metal alloys, and hydrogen. Metals or alloys such as lithium, sodium, sodium amalgam, potassium, magnesium, aluminum, zinc, titanium, arsenic, antimony, tin, silver, and mercury are among those more effectively useful in the invention. Also, metal hydrides such as $TiH_{1.7}$, $Al_2H_6$, $NaH$, $ZnH_2$, and mixed hydrides such as $LiAlH_4$ and $LiBH_4$, can be used.

Again, while particularly described in connection with the oxidation of titanium tetrachloride, the invention is also adaptable to a co-oxidation process such as contemplated in U. S. 2,559,638 wherein small amounts of aluminum chloride are present during the oxidation so as to insure the yield of an improved type of $TiO_2$ pigment. Other types of oxidizing gases than those specified can also be used since use is contemplated of oxidizing gases containing free oxygen ($O_2$), preferably in the dry state, as can mixtures of such gases. Useful types thereof include oxygen, oxygen-enriched air, or mixtures of oxygen or air with various inert gases such as nitrogen, $CO_2$, and the like. If desired, such gases may contain controlled, small amounts of water vapor ranging from .1–3% or from, say, .05–5%, based on the total volume of gaseous reactants being fed to the reaction zone, and in accordance with the disclosure of U. S. Patent 2,488,439. In utilizing the oxidizing media, it is generally preferred to operate the process with amounts of oxidizing gas sufficient to provide about 10% excess oxygen over the theoretical so as to obtain a product gas containing about 30% $Cl_2$ by volume, when air is used as the source of oxygen, and 90–95% $Cl_2$ when gaseous oxygen is employed, with but small or minor amounts of $O_2$. The use of oxygen-enriched air will produce chlorine concentrations intermediate between 30 and 90% $Cl_2$ gas in the oxidation products.

While reaction zone temperatures ranging from 900–1050° C. are preferred for use, temperatures ranging from 800° C. to 1350° C. can also be employed. These temperatures can be readily obtained in a large-scale, commercial operation, by proper adjustment of the ratio of lower titanium chlorides to titanium tetrachloride and preheat temperature of the oxidizing gas and titanium tetrachloride reactant. Any conventional type equipment can be used in the preheating operation, including any suitable type of electrical resistance apparatus or devices adapted to pass the reactants in direct or indirect heat exchange relationship with a heat-imparting medium. One useful type of apparatus comprises one in which the reactants pass over heat transfer surfaces which are heated directly by combustion of fuels or indirectly by circulation of a suitable heat transfer medium.

Normally, the oxidation reaction is effected under atmospheric pressures, but if desired super- or subatmospheric pressures can be resorted to. Similarly, any type or size of corrosion-resistant metal reaction vessel conforming to the scale of operation intended can be used, said vessel being of such design and dimension as will permit a continuous flow of reactants through the reaction vessel, especially the oxidation chamber, and discharge of reaction products therefrom. Furthermore, a continuous, as distinguished from a discontinuous or batch, type of operation is preferred to be effected.

The time period of retention of reactants and reaction products within the reaction zone is also important and critical to the production of a pigment-quality product. In general, the retention time of all reactants within the mixing and reaction zone must not exceed about 5 seconds nor be less than about .01 of a second, with a preferred time, to insure recovery of an optimum quality $TiO_2$ pigment, ranging from .05 to 1 second.

The titanium tetrachloride and reducing agent reactants used preferably comprise high-purity anhydrous materials free of such contaminants as vanadium, iron, copper, etc., whereby production will be assured of a product exhibiting exceptionally high pigment whiteness and brightness. They can be obtained, for instance, by chlorinating a titaniferous ore, such as ilmenite, and purifying the product through careful fractional distillation, in accordance with well-known techniques.

Again, while the process has been described in relation to its application to a $TiCl_4$ oxidation, it is also adaptable to a cooxidation process such as contemplated in U. S. 2,559,638 wherein small amounts of aluminum chloride are present during the oxidation to yield an improved type of $TiO_2$ pigment.

The chemistry of the lower titanium chlorides is quite complex. While titanium trichloride usually sublimes at about 430° C. and disproportionates to form titanium dichloride and titanium tetrachloride at 600° C., the disproportionation reactions appear to start below the sublimation temperature. Furthermore, titanium dichloride also undergoes a disproportionation reaction to form titanium metal and titanium tetrachloride. This reaction starts to take place around 475° C.

Since high temperatures, particularly temperatures within the usual oxidation reaction temperature range, favor disproportionation, control of the nucleating effect at this temperature level is difficult. At 800° C. or below, the reactions can be regulated, to varying degrees. Below 400° C. and to 136° C. (our preferred subchloride nucleator-forming temperature range), little titanium dichloride is produced and direct control of the amount of titanium trichloride formed can be thereby attained. The most effective nucleation effect results by reacting a minor proportion of titanium tetrachloride to form titanium trichloride. This proportion ranges from about .1 to 10 parts of the trichloride per 100 parts of the tetrachloride and hence is preferred herein. If desired, the lower titanium chloride nucleating agents can be used in combination with other known nucleating assistants, such as water vapor, hydrogenous materials, nitrogen oxides, aluminum trichloride, or normally unstable metal subhalides. However, in obtaining high-quality pigment rutile titanium dioxide pigments, one can resort, if desired, to our novel reduced titanium chlorides as the only additive to the reaction at the relatively low titanium tetrachloride preheat temperatures herein contemplated.

The nucleating lower titanium chlorides produced can be charged as formed immediately or separately to the reactor. The amount of chlorides and their nucleating effect obtained will vary, being governed largely by the selection and type of reducing agent used, the temperature of the titanium tetrachloride vapor charged to the lower chloride generator, the surface area of metal exposed within said generator to the titanium tetrachloride vapor, the space velocity of the latter, and the manner of introducing the titanium chloride to the reactor oxidation zone.

For white pigment production, metals forming colorless oxides are preferred for use as reductants since small amounts thereof when reacted with the titanium tetrachloride form a metallic chloride which may be carried over into the oxidation reactor. For example, when tin comprises the reducing metal, small amounts of stannic oxide are produced by cooxidation of stannous chloride along with the titanium chloride mixture, particularly when the titanium tetrachloride vapor enters the lower chloride generator at a temperature above 620° C., the boiling point of stannous chloride. Some aluminum trichloride may be introduced into the reactor along with titanium chloride mixture if aluminum metal or aluminum alloy particles are used as the reducing agent for titanium tetrachloride. Recourse to these types of reducing metal will advantageously improve the color retention characteristics of the final pigment, in addition to affording a desired nucleation effect and lowered titanium tetrachloride preheat temperature.

The function of the reduced chlorides utilized in our invention is not completely understood. It is known, however, that they yield more heat than does titanium tetrachloride upon reaction with oxygen to give titanium dioxide, and that because of their limited stability they are more reactive to oxygen or oxygen-containing gases. Therefore, they react more rapidly than the titanium tetrachloride to form extremely finely divided oxide nucleating particles which assist the main reaction ($TiCl_4$ oxidation) allowing it to proceed more rapidly and with less initial preheat. By varying amounts and point of addition of the lower titanium chlorides, a wide variety of control mechanisms can be established to provide a number of ways for attaining the objectives desired, e. g., improved pigment quality and improved quality control and lower preheat requirements.

The titanium dioxide product from our oxidation process can be recovered from the cooled reaction products by means of conventional separatory treatments, including cyclonic or electrostatic separating media, filtration through porous media, or the like. Following recovery, the pigment product can be subjected in the dry state to a relatively mild calcination treatment until desired chlorine removal is effected. Such temperatures should not exceed 800° C. and usually range from about 500–700° C., with a temperature of about 600° C. being preferred. Thereafter, the chlorine-free product is milled, ground, or disintegrated to remove aggregates and suitably finished in conventional milling equipment, such as a hammer or roller type mill or a fluid energy mill to obtain the desired small particle size pigment. In its finished state the pigment will be of satisfactory uniform small size, e. g., its average particle size radius will range from .05 to .5 micron, and preferably will be from .1 to .25 micron. Being substantially neutral (pH 6.5–7.5), uniformly small in particle size, soft-textured, and inherently high in tinting strength, color, opacity, and other essential pigment properties, it is generally and readily adapted for use in all types of pigment applications, including paints, enamels, lacquers, finishes, or other types of coating composition formulations, as well as a delusterant for rayon, nylon, or other artificial fibers or silks, or as an essential pigmenting ingredient in printing inks, rubber, plastics, and other uses.

We claim as our invention:

1. A process for producing an improved titanium dioxide pigment which comprises reacting by mixing within a closed reaction zone at an elevated temperature ranging from 800–1350° C. vaporized titanium tetrachloride in the presence of a minor amount of a subchloride of titanium as a nucleating agent with an oxygen-containing gas, and thereafter recovering the resulting $TiO_2$ reaction product.

2. A process for producing an improved rutile titanium dioxide pigment which comprises reacting by mixing within a closed reaction zone at an elevated temperature ranging from 800–1350° C. vaporized titanium tetrachloride containing from about .1 to 10 parts of a subchloride of titanium as a nucleating agent to 100 parts of titanium tetrachloride with an oxygen-containing gas, and thereafter recovering and subjecting the resulting $TiO_2$ reaction product to pigment finishing.

3. A process for producing rutile titanium dioxide pigment which comprises reacting by mixing within a closed reaction zone maintained at an elevated temperature ranging from 800–1350° C. over a controlled period of time a heated oxygen-containing gas with vaporized titanium tetrachloride in the presence of a small amount of lower titanium chlorides as a nucleating agent, and thereafter subjecting the recovered $TiO_2$ product to mild calcination treatment followed by a milling treatment.

4. A process for producing rutile titanium dioxide pigment which comprises reacting by mixing within a closed reaction zone maintained at an elevated temperature ranging from 800–1350° C. and over a controlled period of time titanium tetrachloride vapor preheated to a temperature substantially below the oxidation reaction temperature and prereacted with a reducing agent to form therein a minor proportion of lower titanium chlorides as a nucleating agent, with a heated oxygen-containing gas, and thereafter subjecting the recovered pigment to a mild calcination followed by a milling treatment.

5. A process for producing rutile titanium dioxide pigment which comprises reacting at an elevated temperature and over a controlled period of time vaporized titanium tetrachloride preheated to a temperature between its boiling point and about 400° C. and containing a minor portion of a titanium subchloride as a nucleating agent, with a heated oxygen-containing gas, and thereafter subjecting the recovered $TiO_2$ product to a pigment finishing treatment.

6. A process for producing rutile titanium dioxide pigment which comprises reacting at temperatures ranging from 800–1350° C. an oxygen-containing gas with titanium tetrachloride preheated to a temperature ranging from about 136–400° C. and prereacted with a reducing agent to form therein a minor proportion of a lower titanium chloride as a nucleating agent, and thereafter subjecting the recovered pigment to a mild calcination followed by a milling treatment.

7. A process for producing an improved rutile $TiO_2$ pigment which comprises reacting at temperatures ranging from about 900–1050° C. an oxygen-containing gas with titanium tetrachloride preheated to from 136–400° C. and containing from .1–10 parts by weight of titanium trichloride as a nucleating agent, effecting said reaction over a time period of from .05–1 second within a closed reactor, recovering the resulting $TiO_2$ reaction product and subjecting it to calcination at temperatures ranging from about 500–700° C. to remove chlorine present therein, and then milling the chlorine-freed product to desired texture form.

References Cited in the file of this patent

UNITED STATES PATENTS

| Number | Name | Date |
|---|---|---|
| 1,850,286 | Mittasch et al. | Mar. 22, 1932 |
| 2,178,685 | Gage | Nov. 7, 1939 |
| 2,184,884 | Muskat | Dec. 26, 1939 |
| 2,240,343 | Muskat | Apr. 29, 1941 |
| 2,306,184 | Pechukas | Dec. 22, 1942 |
| 2,488,439 | Schaumann | Nov. 15, 1949 |

OTHER REFERENCES

"Titanium" by Barksdale, 1949 ed., page 81. Ronald Press Co., N. Y.